United States Patent [19]

Keller et al.

[11] Patent Number: 4,862,158
[45] Date of Patent: Aug. 29, 1989

[54] EXTENSION ARRANGEMENT AND STATION CONNECTING METHOD FOR A RING COMMUNICATION SYSTEM

[76] Inventors: Heinz J. Keller, Alte Landstrasse 30, CH-8803 Ruschlikon; Johann R. Mueller, Erlenweg 7, CH-8135 Langnau am Albis, both of Switzerland

[21] Appl. No.: 183,377

[22] Filed: Apr. 11, 1988

Related U.S. Application Data

[63] Continuation of Ser. No. 848,605, Apr. 7, 1986, abandoned.

[30] Foreign Application Priority Data

Apr. 23, 1985 [EP] European Pat. Off. ......... 85104886.8

[51] Int. Cl.$^4$ .............................................. H04Q 1/00
[52] U.S. Cl. .............................. 340/825.050; 370/86; 375/107
[58] Field of Search ............................. 370/86, 87, 88; 340/825.05, 825.2; 375/107; 307/22, 26, 17

[56] References Cited

U.S. PATENT DOCUMENTS

4,173,714 11/1979 Bloch et al. .
4,293,948 10/1981 Soderblom ..................... 370/86 X
4,417,242 11/1983 Bapst et al. ..................... 370/86 X Primary Examiner—Ulysses Weldon

[57] ABSTRACT

A ring communication system comprises distribution panels (13) for inserting extension lines (15) and attached stations (19) into the communication ring (11); insertion is requested and controlled by DC signaling from the station via a phantom path. To allow attachment of several stations via additional extension lines (25) to a single basic extension line (15), extension distribution panels (23) are provided comprising line insertion moduels (31) like the basic distribution panels. Insertion of a station and its additional extension line (25) up to the EXP is still controlled by DC signaling from the station, but insertion of the basic extension line (15) is controlled by a tone signal transferred from the EXP to the basic distribution panel via a phantom path. The EXP (23) needs no own power supply because DC power is provided from the basic distribution panel (13) via the phantom circuit of the basic extension line.

6 Claims, 5 Drawing Sheets

EXTENSION ARRANGEMENT AND STATION CONNECTING METHOD FOR A RING COMMUNICATION SYSTEM

This is a continuation of co-pending application Ser. No. 06/848,605 filed on 04/07/86 and now abandoned.

FIELD OF INVENTION

Present invention relates to ring communication systems, and in particular to an arrangement for connecting stations to a ring communication network comprising distribution panels by which extension lines for stations can be inserted into the main ring, and also to a method for connecting workstations to a ring communication network.

BACKGROUND

Ring communication systems in which the ring comprises distribution panels or wiring boxes for inserting or bypassing extension lobes (connection lines for extending the ring) are well known, e.g. from the publication by W. Bux et al. "A Local-Area Communication Network Based on a Reliable Token-Ring System", published in "Local Computer Networks", North Holland Publishing Co., 1982, pp 69–82, from U.S. Pat. No. 4,417,242, from European patent application No. 0,082,889, and from the Standards IEEE-802.V and ECMA-89 for token ring systems. In such ring communication systems, one station can be connected to each extension lobe, e.g. through a wall outlet at a remote end of the lobe. When the station is powered up, it sends a DC current as insertion request to the distribution panel (wiring box) which then changes the switch settings for the respective extension lobe from BYPASS to INSERTED, thus incorporating the extension line plus the station (or more exactly its adapter) into the main ring.

These known systems operate well for attaching a single station to each extension lobe. In certain situations, there will be a need for attaching a group of stations to a single wall outlet of a ring communication system, and to place at least some of these stations in a more remote location where no wall outlet exists, connecting each one by an additional cable to the basic extension lobe.

The individual insertion of the stations of such groups plus their additional cables into the main ring will be difficult if the principle of DC signaling as insertion request is to be maintained. Placing a normal basic distribution panel instead of a wall plug at the end of a basic extension lobe to enable the attachment of several stations or branch lines will not be possible because the DC signal path which is a phantom circuit using the two wire pairs of an extension lobe would be interrupted at such normal distribution panel. Furthermore, no DC power would be available at the location of a wall outlet which was replaced by a normal distribution panel so that sending a DC signal as an insertion request from the intermediate location (original place of wall outlet) to the basic distribution panel in the main ring is not possible.

Two solutions were suggested for attaching a group of stations to a single wall outlet in a ring communication system. An article "Loop Cabling System" by F. Almquist et al., IBM Technical Disclosure Bulletin, Vol. 24, No. 9, Feb. 1982, pp. 4818–4820 discloses an arrangement for connecting a complete subloop with several station connectors between two outlets of a basic distribution panel (wiring connection box). This arrangement, however, does not provide for the automatic insertion of a station and its subloop into the ring under remote control by a DC signal from said station so that the usual standard technique for automatic insertion caused by DC signaling would have to be changed. An article "Local Area Station Network Connector" by E.J. Annunciata et al., IBM Technical Disclosure Bulletin, Vol. 27, No. 2, July 1984, pp. 953–955 also disclosed an arrangement in which several stations are attached to a single outlet of a distribution panel (wiring concentrator). This arrangement requires, if DC signaling from the station for insertion control is to be maintained, the provision of particular (bistable) relays which may not be desirable, and further provides the connection of all stations of the group to a wall outlet by a common additional line and not by separate individual lines which may also not be desirable.

OBJECTS OF THE INVENTION

It is a primary object of the invention to enable, in a ring communication system comprising distribution panels for attaching extension lobes and stations, the attachment of a plurality of stations to a single outlet or extension lobe.

It is a further object of this invention to enable the attachment of several stations to one distribution panel outlet without the necessity to change the DC insertion signaling technique in the stations or their adapters, so that the same station circuitry can be used for single directly attached stations and for stations attached in a group.

Another object of the invention is to enable the attachment of an extension distribution panel for a group of stations to a basic extension lobe and to feed DC power to this extension panel via the extension lobe, without eliminating the principle that each station signals its insertion request to the system by a DC current.

A further object is an arrangement for attaching a group of stations to a ring distribution panel outlet which allows to maintain the phantom circuit structure in stations and distribution panels.

Another object is an arrangement for attaching a group of stations to a ring transmission system, which requires a minimum in additions or alterations to existing distribution panels, and which allows to use very similar distribution panels as basic distributors in the main ring but also as extension distributors at the remote end of basic extension lobes.

A further object of the invention is a ring communication system in which several stations can be attached to one outlet or extension lobe of a distribution panel in such a way that each station can be individually inserted or removed from the ring and can have its own individual branch line which is not part of the fixed wiring system.

DISCLOSURE OF THE INVENTION

These objects are achieved by the invention which provides, in a ring communication network having basic distribution panels and extension lines, an extension distribution panel at the remote end of an extension line, for attaching a plurality of stations; insertion modules in said extension panel, each for connecting a branch line plus a station to the basic extension line upon receiving a DC signal from said station; means for sending an AC (tone) signal as insertion request from the extension panel to the basic distribution panel via the basic extension line; and means for receiving said AC (tone) signal and then causing insertion of the basic extension line into the main ring; thus connecting the remote station into the main ring.

When using this arrangement and method, stations and their adapters need not be changed at all. Basic distribution panels need only few additions for enabling the invention, i.e. a tone receiver and a manual switch in each line module to either select DC signaling or AC (tone) signaling for insertion requests. Additional extension distribution panels which can replace single wall outlets to accommodate attachment of several stations, can use the same design as the basic distribution panels (in particular, same line insertion modules) with only an additional tone generator.

Thus the invention allows, with a given fixed wiring structure of a local area ring network, to attach multiple stations, each with a branch line, to a single wall outlet by providing an extension panel, requiring only small modifications to switching boxes of the existing wiring network but no modification to the work stations.

Further features and advantages of the invention will become apparent from the following detailed description of a preferred embodiment in connection with the accompanying drawings.

DETAILED DESCRIPTION

(1) SYSTEM OVERVIEW

Figure 1:
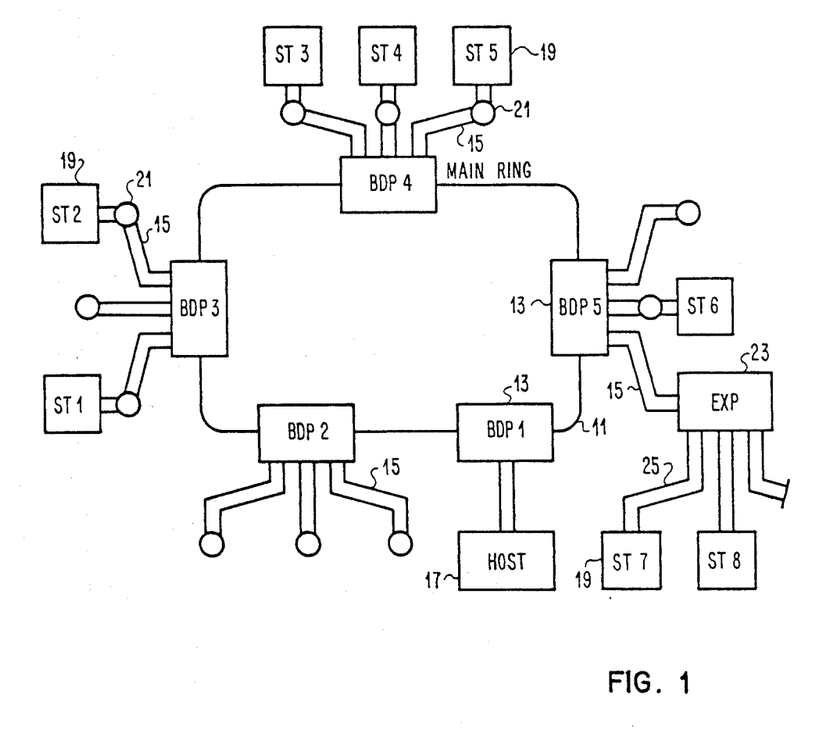
FIG. 1 is an overview of a ring communication system with basic distribution panels and extension lobes, in which the invention is used.

FIG. 1 is a basic outline of a ring communication system in which present invention is used. The system comprises a main ring 11 with a plurality of basic distribution panels (BDP) 13. From each of the basic distribution panels BDP one or more extension lobes 15 extend to which data processing units can be attached. These units may include a host system 17 and several stations (ST) 19 such as display terminals or the like. A wall outlet 21 may be provided at the end of each extension lobe for plugging in a terminal station 19 as required.

As is well known for ring transmission systems, the distribution panels comprise insertion/bypass switches, and an extension lobe and its attached station are inserted into the ring only if the station is activated. Any extension lobe to which no terminal station is attached or at which the attached terminal is not in operation is bypassed and thus does not unnecessarily increase the total length of the ring system.

There are situations in which it is desirable to attach more than one station to a single extension lobe or wall outlet. This may be the case when the number of stations must be increased much more than initially planned. The number of distribution panels and thus the number of basic extension lobes and of wall outlets could be increased but this is very undesirable because the changing of the basic wiring in a building is extremely expensive.

There is shown in FIG. 1 a possibility how the number of stations can be increased without changing the basic wiring or increasing the number of extension lobes and wall outlets. Instead of one wall outlet, an extension distribution panel (EXP) 23 is provided to which a plurality of additional branch lines 25 are connected. One station 19 could be attached to each of the branch lines 25. The extension distribution panel EXP can be of the same design as the basic distribution panels BDP: It contains switches for either inserting or bypassing any of the additional branch lines 25.

There are a few problems with such an extension distribution panel EXP which are solved by present invention. First of all, the basic extension lobe 15 to which the EXP is attached should be inserted into the main ring only if any one of the remote stations (ST7, ST8) connected by branch line 25 is active; otherwise, the basic extension lobe 15 should be bypassed. Furthermore, the stations to be attached remotely should be of a standard design and should be connectable without modification to either a BDP 13 or an EXP 23. In particular, the signaling of station activation by a DC current from the station (as usual in such ring communication systems) should be maintained. And in addition, the distribution panels BDP and EXP should be as similar as possible, and only few modifications to the basic well-known design of such distribution panels should be necessary.

How these goals are achieved will be explained in the next section.

(2) BASIC PRIOR ART INSERTION MECHANISM

Figure 2:
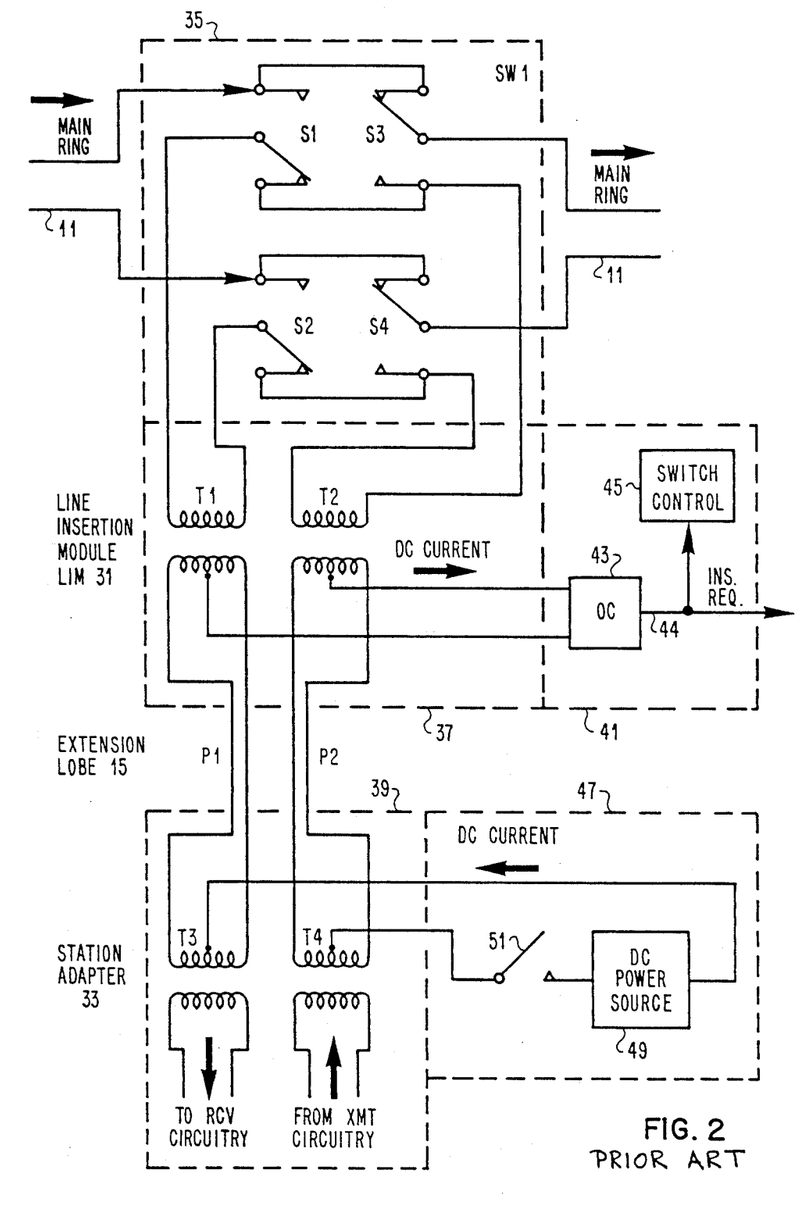
FIG. 2 is a schematic representation of prior art circuitry providing a phantom circuit between a distribution panel and an attached station, for DC signaling of insertion requests.

FIG. 2 shows the arrangement for inserting or bypassing an extension lobe in a ring system as it is known already (e.g. from the ECMA-89 Standard for token ring systems). This is a simplified schematic representation omitting circuit details not important for the invention, e.g. details for wire fault detection.

The basic distribution panel BDP comprises for each extension lobe a line insertion module (LIM) 31. Each LIM is connected by the respective extension lobe 15 which consists of two twisted wire pairs P1 and P2, to a station adapter 33 of the respective station. Insert-/bypass switch bank 35 (SW1) comprising switches S1 . . . S4 is provided in each LIM for either bypassing or inserting the extension lobe. The switches can either be relay contacts or electronic gates. Transformers T1, T2 (in transformer section 37 of the LIM) and T3, T4 (in transformer section 39 of the station adapter) are provided for transferring AC signals between the incoming and outgoing ring wire pairs (11), the twisted pairs (P1, P2) of the extension lobe (15), and the receive and transmit circuitry of the station.

The LIM 31 further comprises a switch control section 41 which includes an insertion request transfer circuit 43, e.g. an optocoupler OC, and switch control circuitry 45 which controls the simultaneous setting of switches S1 . . . S4 to either the one or the other of two positions.

Through center taps at the transformers, a phantom circuit is constituted by the two twisted pairs P1, P2 of the extension lobe for transferring a DC signal which controls the insertion of an extension lobe and attached station into the ring. The station adapter comprises respective switch control circuitry 47 which includes a DC power source 49 and a switch 51. When switch 51 is closed (which may be effected automatically when the station power is switched on), a DC current is sent through the phantom circuit to the line insertion module LIM in the basic distribution panel. In the LIM, the DC current is passed to opto-coupler 43 which transfers the insertion request on line 44 to switch control circuitry 45 which then changes the setting of the insert-/bypass switches S1 . . . S4 to the "inserted" state.

(3) DC SWITCHING CONTROL WITH EXTENSION PANELS

As can easily be seen from the arrangement of FIG. 2, the DC phantom circuit will be interrupted by an intermediate extension distribution panel EXP if this also provides transformer coupling for the pair of data transmission lines, as desirable. Furthermore, if the extension distribution panel has no power supply of its own so that DC power must be fed via the basic extension lobe from the basic distribution panel, insertion request signaling by a DC current on the same line is not possible. Therefore, the standard DC control for station insertion cannot be used beyond an extension distribution panel EXP, i.e., in the section between the EXP and the BDP.

Figure 3:
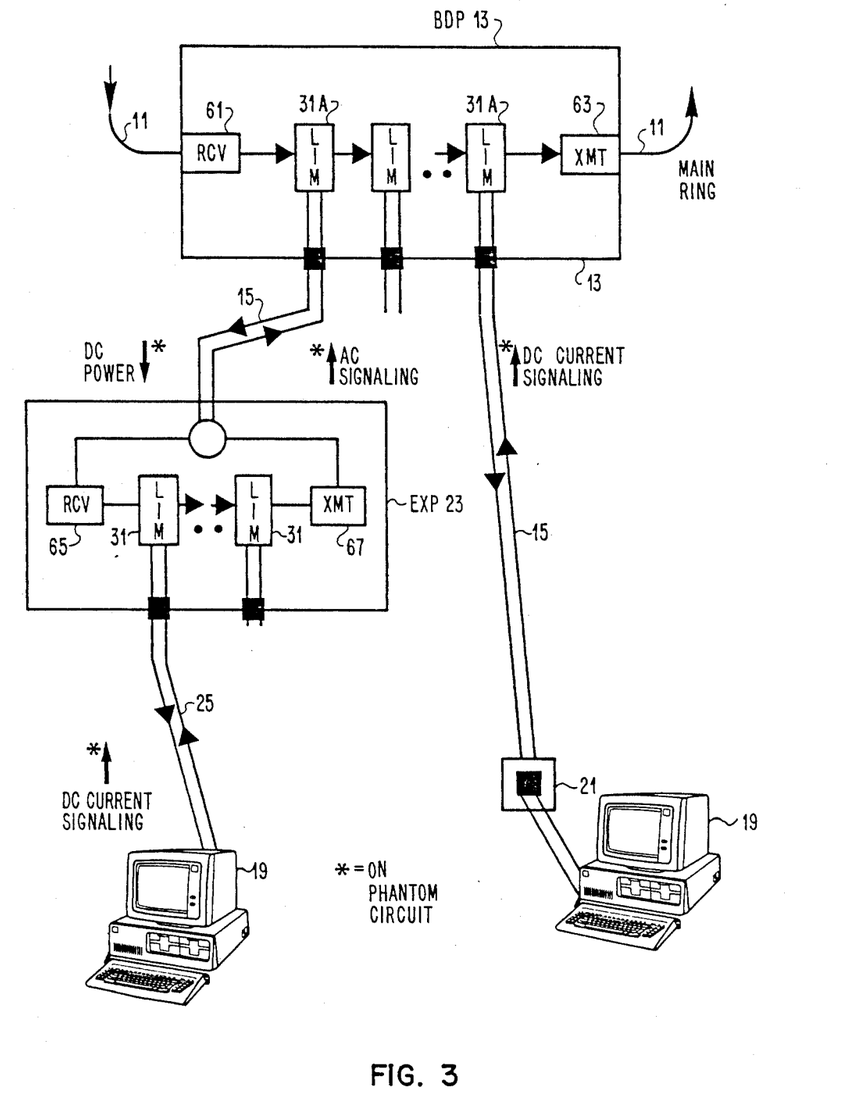
FIG. 3 schematically shows the novel solution for signaling an insertion request and achieving the insertion, for either a single attached station or for each station in a group of stations attached to one outlet or extension lobe.

FIG. 3 schematically shows how this problem is solved in the invention. In the figure, there can be seen a basic distribution panel BDP 13 in the main ring 11.

The BDP comprises a number of modified line insertion modules (LIM) 31A connected in series, as well as a ring receiver (RCV) and a ring transmitter (XMT) 63. One station 19 (lower right) is connected via a wall outlet 21 and extension lobe 15 directly to its LIM in BDP 13. Another station 19 (lower left) is connected via an additional branch line 25 to an extension distribution panel EXP 23. Branch line 25 is equal to the extension lobe 15 as shown in FIG. 2, i.e. it consists of two twisted wire pairs and constitutes a phantom circuit in combination with the terminating circuitry at both ends. EXP 23 comprises a number of line insertion modules 31 which are connected in series, as well as a receiver 65 and a transmitter 67. The receiver and the transmitter are connected each to one twisted pair of a regular extension lobe 15, which as usual is connected to a line extension module LIM in the BDP 13.

It should be noted that a receiver 65 and a transmitter 67 are required in the EXP 23 only if the switches in the LIMs 31 are electronic gates; if they are relays, no extra receiver and transmitter are required in the EXP.

Both stations (19), when being connected or activated, send a DC current through the phantom circuit of their connecting line (15 or 25, respectively) as insertion request. For the directly connected station, this DC current causes insertion of the extension lobe and station into the ring as described already.

For the indirectly connected station, the insertion requesting DC current is sensed in the respective LIM of the extension distribution panel EXP, causing the connection of branch line 25 to basic extension lobe 15, and furthermore the transmission of an AC signal (e.g. a tone signal) via the phantom circuit of extension lobe 15 ( at that time not yet inserted into main ring 11) to the basic distribution panel BDP. The respective line module 31A in the BDP, upon receiving the tone signal, causes insertion of the extension lobe 15, and thus also of the extension panel 23, branch line 25, and the attached station 19 into the main ring. The necessary DC power for the tone generator (and other circuitry) in the EXP is furnished from the BDP 13 through a phantom path using the wire pairs of extension lobe 15. Thus, no extra wire for DC feeding is required. If the switches in LIMs 31 of the EXP are electronic gates, DC power will also be furnished to these LIMs and to the receiver 65 and transmitter 67.

After one station and its extension line 25, plus the basic extension lobe 15 were inserted into the main ring, another station 19 connected to the same extension distribution panel 23 may require insertion by sending a DC current to the EXP. Thereupon, the respective station 19 and branch line 25 are connected by the associated LIM 31 to the basic extension lobe, as required, in series with the other station and its branch line (both branch lines and the basic extension lobe forming one single extension loop for the main ring). The line insertion module LIM of the second station will also activate the tone signal generator, but this will have no more effect because the basic extension lobe 15 was already inserted into the main ring for the first station.

The modifications which are necessary for the LIM 31 of FIG. 2 to become a LIM 31A of FIG. 3 will be described in the next section in connection with FIG. 4. Some details of the extension distribution panel 23 will then be described in another section in connection with FIG. 5.

(4) MODIFIED LINE INSERTION MODULE IN BASIC DISTRIBUTION PANEL

Figure 4:
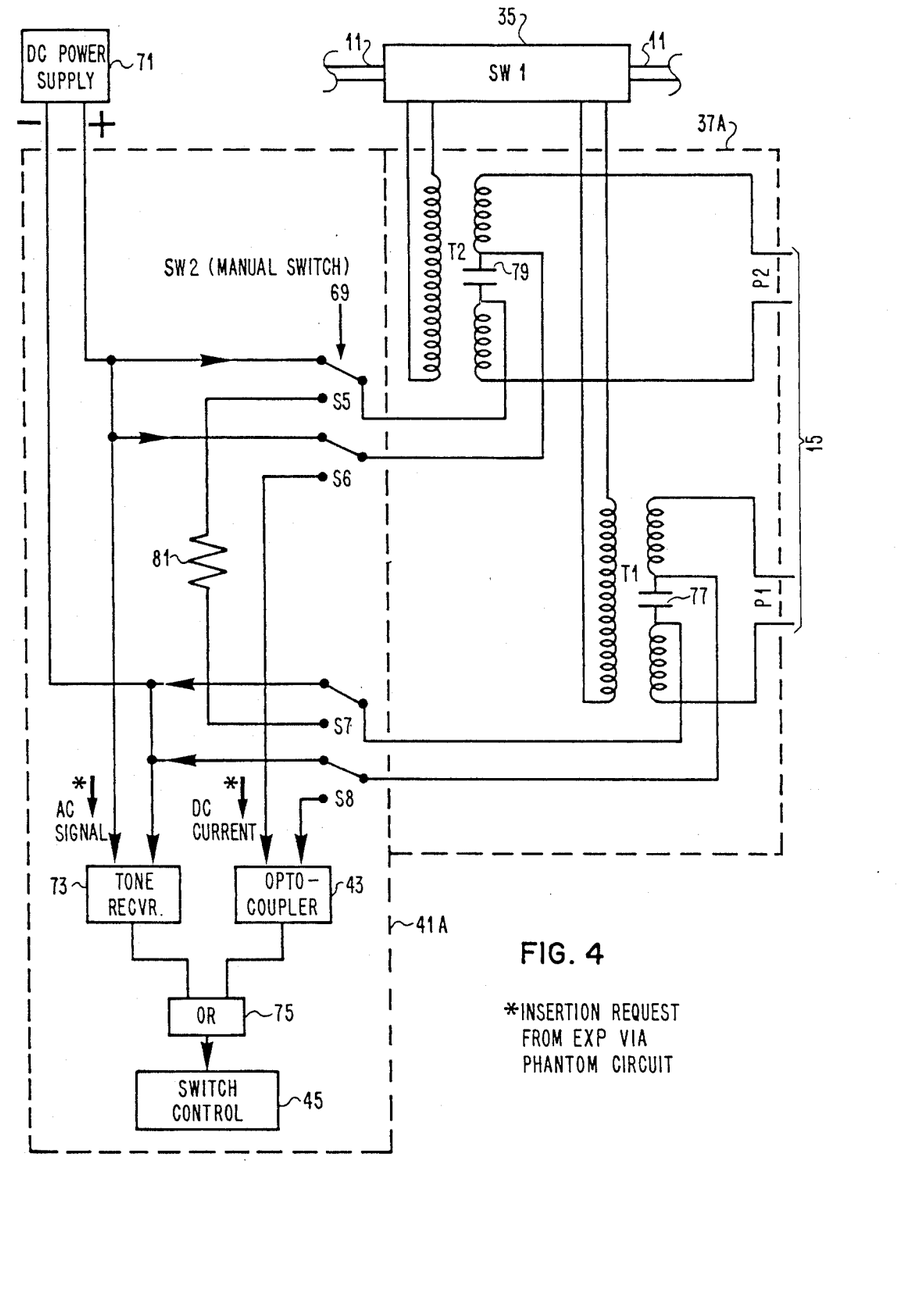
FIG. 4 is a block diagram of a line insertion module of a basic distribution panel showing the additions required for implementing the invention.

FIG. 4 shows some details of the modified line insertion module 31A that is required in the basic distribution panel BDP if the system is provided with extension distribution panels EXP. The modified LIM also comprises an insertion/bypass switch bank (SW1) 35 (same as in FIG. 2), a transformer section 37A, and a modified switch control section 41A. In addition, each modified LIM 31A is connected to a common DC power source 71 in the BDP which must be additionally provided if it is not available anyway (as in an active distribution panel).

In FIG. 4 (and later also in FIG. 5) the transformers are shown with two center taps separated by a capacitor as needed for wire fault detection (this was not shown in FIG. 2 for simplicity reasons).

The switch control section 41A comprises a manually operated mode switch bank (SW2) 69 which includes individual switches S5 . . . S8. This mode switch SW2 allows to connect the phantom circuit of the extension lobe 15 (P1, P2) either to a signal transmission circuit 43 ( e.g. an optocoupler) for receiving a DC current (as is done in the arrangement of FIG. 2), or to connect the DC power source 71 to the phantom circuit of extension lobe 15 for providing DC power to an extension distribution panel EXP, and simultaneously connecting this phantom circuit to an additionally provided tone receiver 73, for receiving a tone signal from an extension distribution panel EXP. The outputs of optocoupler 43 and of tone receiver 73 are connected to an OR circuit 75 whose output is connected to switch control circuitry 45 so that activation of the insertion/bypass switch SW1 (section 35) can be caused either by a DC current or by a tone signal.

There are provided two center taps in each transformer which are separated by a capacitor 77 or 79, respectively for enabling wire fault detection (as mentioned above). When mode switch SW2 (69) is in its lower position, it connects optocoupler 43 to one center tap of each transformer. The two other center taps are connected in this switch position to a resistor 81 for achieving the correct balance, because this is needed for the station adapter to determine a line fault.

As was mentioned already, mode switch SW2 (69) is set manually. This is done separately for each line insertion module LIM 31A, depending on whether only one station will be connected to the respective extension lobe 15, or an extension distribution panel EXP for several stations will be attached to the end of the respective extension lobe 15.

(5) EXTENSION DISTRIBUTION PANEL EXP

Figure 5:
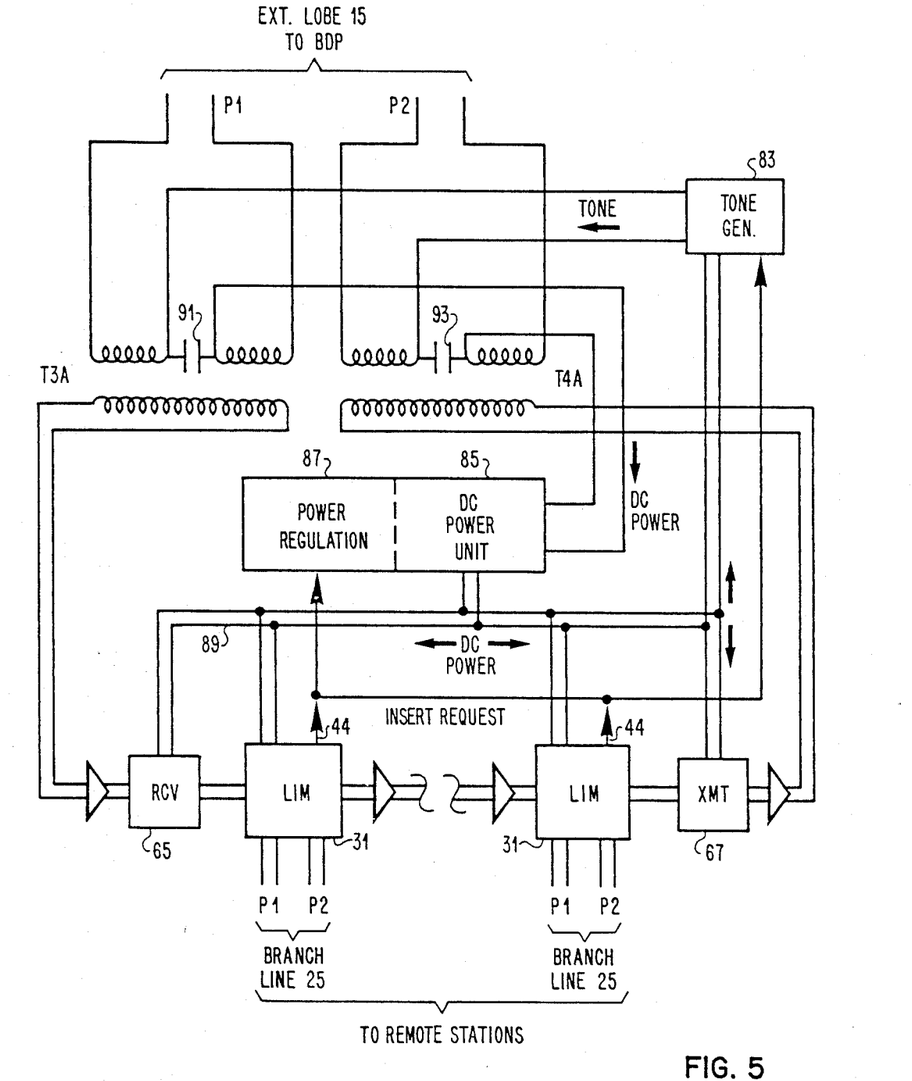
FIG. 5 is a block diagram of an extension distribution panel for attaching a group of stations to a single extension lobe, according to the invention.

A block diagram of the extension distribution panel EXP is shown in FIG. 5. As was already mentioned in connection with FIG. 3 (section 3), the EXP comprises a plurality of line insertion modules (LIM) 31 connected in series and a receiver (RCV) 65 and a transmitter (XMT) 67. A branch line 25 (including a twisted pair P1, P2 constituting a phantom circuit) is connected to each LIM. The EXP also comprises two transformers T3A and T4A (corresponding to those comprised in each station adapter, cf. FIG. 2) which are connected to the twisted wire pairs P1, P2 of an extension lobe 15 that in turn is connected to a basic distribution panel BDP.

Two additional units are provided in the EXP: A tone generator 83, and a DC power unit 85. A control input of the tone generator is connected to an insert request line that is connected to the insert request line 44 of each LIM (cf. FIG. 2), and it outputs on which a tone is furnished are connected to center taps of transformers TR3A and TR4A. The DC power unit 85 is connected to center taps of the transformers for receiving DC power, and has attached to it (or incorporated) power regulation circuitry 87 of which a control input is also connected to the insertion request lines 44 of all LIMs. The DC power unit 85 distributes DC power via DC bus 89 to tone generator 83, and to the LIMs 31 (if they have electronic switches) and to receiver 65 and transmitter 67.

Capacitors 91 and 93 are provided to separate the two center taps in each of transformers T3A and T4A, respectively, so that wire fault detection is possible (as mentioned).

Operation is as follows: As soon as any one of the LIMs 31 receives an insertion request, i.e. a DC current on its attached branch line 25, the LIM changes the setting of its insertion/bypass switches and connects the branch line to the extension lobe (i.e. insertion of the branch line between receiver 65 and transmitter 67). Simultaneously, the LIM activates an insertion request signal on line 44 that causes tone generator 83 to emit a tone signal that is transferred via the phantom circuit of extension lobe 15 to the basic distribution panel (which then inserts the extension lobe 15 into the main ring 11 if this was not yet the case already).

The power regulation circuitry 87 reduces the DC power received by DC power unit 85 from the basic distribution panel to a low level when no insertion signal on line 44 is activated. As soon as an insertion request signal on a line 44 becomes active, the power regulation unit allows enough DC power to be accepted by DC power unit 85 so that the tone generator 83, the receiver 65, the transmitter 67 and the LIMs 31 (if they have electronic gates) can operate properly. This reduces power consumption of an extension distribution panel at which no station is active to a minimum.

(6) ADDITIONAL CIRCUITRY

The block diagram of the basic distribution panel 13 in FIG. 4 only shows the portions which are of interest for the invention. There may be, of course, provided in each BDP additional circuitry that is necessary for proper system operation such as buffers, retiming units, dejittering circuits, etc.

What is claimed is:

1. Method for connecting a workstation at a remote location to a ring communication network via a basic switching unit, a remote switching unit, a basic extension line interconnecting said basic switching unit and said remote switching unit and a remote extension line connected between said remote switching unit and said remote workstation, comprising the steps of:

sending a DC signal as insertion request from the workstation via the remote extension line to the remote switching unit, connecting, in the remote switching unit in response to the DC signal insertion request, the remote extension line to the basic extension line, sending an AC signal as insertion request from the remote switching unit via the basic extension line to the basic switching unit, and connecting, in the basic switching unit in response to the AC signal insertion request, the basic extension line to the main ring network.

2. A method according to claim 1, characterized by the additional step of furnishing DC power from the basic switching unit via the basic extension line to the remote switching unit, at least for generating said AC signal.

3. A method according to claim 2, characterized in that said sending of a DC signal, said sending of an AC signal, and said furnishing of DC power is affected via phantom circuits constituted by said basic and remote extension lines.

4. An arrangement for connection stations (19) to a ring communication network (11) comprising:

at least one distribution panel (13) having an input (61) and an output (63) attached to the ring network and a plurality of first line insertion modules (31) connected in series between the input and output, each of said first line insertion modules including a first access port (35,37A) for providing access to the series circuit between the input and output of the distribution panel;

at least one extension panel (23) having an input (65) and an output (67) and a plurality of second line insertion modules (31) connected in series therebetween, each of said second line insertion modules including a second access port (35,37) for providing access to the series circuit between the input and output of the extension panel;

an extension line (15) interconnecting the first access port of a first line insertion module and the input and output of an extension panel;

said second line insertion modules each including;

first means (43,44,45,S2,S4) responsive to DC current received at its second access port for inserting the associated second access port in the series circuit between the input and output of the extension panel and providing a status signal when DC current is present at the said second access port;

at least one second means (19,33,47) including a station connected to the second access port of a second line insertion module for providing a DC current to the access port while the station is to be connected to the ring communication network;

each said extension panel including third means (83) responsive to a status signal from a second line insertion module for applying an AC signal to the extension line connected to the extension panel;

said first line insertion module also including;

four means (69,73,75,45) responsive to the AC signal provided by the third means via the extension line for inserting the first access port of the first line insertion module receiving the AC signal into the series circuit between the input and output of the distribution panel in which it resides.

5. An arrangement according to claim 4 in which:

each distribution panel includes fifth means (69,71) for sending DC power to an extension panel via the extension line interconnecting the extension panel to a first line insertion module; and each extension panel includes means (85,87,89) for receiving DC power via the extension line connecting it to the distribution panel and for applying DC power to the said third means.

6. An arrangement according to claim 5 in which:

each distribution panel includes switching means (69) for selectively connecting the extension line (15) to a DC current receiver (43) or to a DC power source (71) and an AC signal detector (73).

* * * * *